US006717290B2

(12) United States Patent
Hirota et al.

(10) Patent No.: US 6,717,290 B2
(45) Date of Patent: Apr. 6, 2004

(54) VEHICULAR DOOR LATCH OPERATION CONTROL DEVICE

(75) Inventors: Koichi Hirota, Anjo (JP); Norikazu Kobayashi, Chita (JP); Takaya Aiyama, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 463 days.

(21) Appl. No.: 09/880,926

(22) Filed: Jun. 15, 2001

(65) Prior Publication Data

US 2002/0021010 A1 Feb. 21, 2002

(30) Foreign Application Priority Data

Jun. 15, 2000 (JP) ....................................... 2000-180320

(51) Int. Cl.[7] ................................................ B60R 25/00
(52) U.S. Cl. ....................... 307/10.2; 292/201; 180/286
(58) Field of Search .............................. 307/10.2, 10.4; 180/114, 286, 287; 340/426.1–426; 292/201, 216, DIG. 23, DIG. 27

(56) References Cited

U.S. PATENT DOCUMENTS 4,974,886 A * 12/1990 Kleefeldt et al. ........... 292/201
5,293,160 A * 3/1994 Kurozu et al. ............... 340/5.3
5,584,515 A * 12/1996 Silye .......................... 292/201
6,045,168 A * 4/2000 Johnson et al. ............. 292/216

FOREIGN PATENT DOCUMENTS

JP 2657876 B2 6/1997

* cited by examiner

*Primary Examiner*—Gregory J Toatley, Jr.
(74) *Attorney, Agent, or Firm*—Burns, Doane, Swecker & Mathis, L.L.P.

(57) ABSTRACT

To expand the versatility of the design specification for a vehicle door, a vehicle door latch operation control device includes a controller which operates a latch release actuator to allow the door to open. The controller has a lock/unlock setting portion which sets an unlock state and a lock state for allowing the latch release actuator to operate and prohibiting the latch release actuator from operating in such a manner that establishing the unlock and lock states at the inside of a vehicle is made independent of establishing the unlock and lock states outside the vehicle.

7 Claims, 10 Drawing Sheets

| | | Double Lock Function | Child-proof Lock Function | In-Switch Manipulation One-Motion Open Function | In-Switch Manipulation Two-Motion Open Function | Knob Switch Manipulation | Key Switch Manipulation |
|---|---|---|---|---|---|---|---|
| Driver's Seat Side Door | Inboard Side | Locked State | Lock/Unlock | Unlocked State | | Lock/Unlock | |
| | Outboard Side | Locked State | Lock/Unlock | Lock/Unlock | | | Lock/Unlock |
| Passenger's Seat Side Door | Inboard Side | Locked State | Lock/Unlock | | Lock/Unlock | Lock/Unlock | |
| | Outboard Side | Locked State | Lock/Unlock | | Lock/Unlock | | Lock/Unlock |
| Rear Right/Left Seat Side Door | Inboard Side | Locked State | Locked State | | | Lock/Unlock | |
| | Outboard Side | Locked State | Lock/Unlock | | | | Lock/Unlock |

Fig.10

| | | Double Lock Function | Child-proof Lock Function | In-Switch Manipulation One-Motion Open Function | In-Switch Manipulation Two-Motion Open Function | Knob Switch Manipulation | Key Switch Manipulation |
|---|---|---|---|---|---|---|---|
| Driver's Seat Side Door | Inboard Side | Locked State | Lock/Unlock | Unlocked State | | Lock/Unlock | |
| | Outboard Side | Locked State | Lock/Unlock | Lock/Unlock | | | Lock/Unlock |
| Passenger's Seat Side Door | Inboard Side | Locked State | Lock/Unlock | | Lock/Unlock | Lock/Unlock | |
| | Outboard Side | Locked State | Lock/Unlock | | Lock/Unlock | | Lock/Unlock |
| Rear Right/Left Seat Side Door | Inboard Side | Locked State | Locked State | | | Lock/Unlock | |
| | Outboard Side | Locked State | Lock/Unlock | | | | Lock/Unlock |

VEHICULAR DOOR LATCH OPERATION CONTROL DEVICE

This application is based on and claims priority under 35 U.S.C. §119 with respect to Japanese Patent Application No. 2000-180320 filed on Jun. 15, 2000, the entire content of which is incorporated herein by reference.

FIELD OF THE INVENTION

The present invention is generally directed to a vehicle door latch. More particularly, the present invention pertains to a vehicular door latch operation control device which includes a latch release actuator for operating a vehicular door latch mechanism.

BACKGROUND OF THE INVENTION

A known vehicular door latch operation control device is disclosed in, for example, Japanese Patent Publication No. 2657876. This known device includes a latch release actuator driving a latch mechanism which holds the door relative to a vehicle body so as to allow the door to be opened, a trigger mechanism for turning on and off the latch release actuator, and a controller for controlling operation of the latch release actuator on the basis of an operation signal issued from the trigger mechanism.

The controller has a lock/unlock setting portion for establishing an unlock state and a lock state which respectively allow and inhibit the latch release actuator to operate. Irrespective of inside or outside the vehicle, when the lock state is established by the lock/unlock setting portion, even upon input of the signal from the trigger mechanism, the latch release actuator fails to operate. Only when the unlock state is established by the lock/unlock setting portion, the controller causes the latch release actuator to operate when the signal from the trigger mechanism is inputted to the controller.

However, each of the lock state and the unlock state established by the lock/unlock setting portion of the controller provides a sole mode in the inside or the outside of the vehicle body. This results in limited versatility in door design specification.

More specifically, a driver seat side door is normally designed to have a so-called "one motion open function" which allows the driver seat side door to open in such a manner that the driver seat side door even in the locked state is transferred to the unlocked state by manipulating the trigger mechanism from inside the vehicle. In addition, the rear seat side door is oftentimes a so-called "child-proof lock function" so that the rear seat side door cannot open if the trigger mechanism is manipulated from inside the vehicle even when the rear side seat door is in the unlock state. However, it is oftentimes difficult to realize that the specification of the known device has the aforementioned functions.

A need thus exists to expand the versatility in door function specification.

SUMMARY OF THE INVENTION

The present invention provides a vehicular door latch operation control device having a latch release actuator driving a latch mechanism which holds the door relative to a vehicle body so as to allow the door to be opened, a trigger mechanism for turning on and off the latch release actuator, and a controller controlling operation of the latch release actuator on the basis of an operation signal issued from the trigger mechanism. The controller is provided with a lock/unlock setting portion which independently establishes the lock and unlock states at each of the inside and outside of the vehicle.

In accordance with the present invention, the inside and the outside of the vehicle is capable of being provided with its own unlock and lock states which are established by the lock/unlock portion of the controller in response to the signal from the trigger mechanism and which allow and inhibit, respectively, the latch release actuator to operate. Thus, the present invention can provide one or more of a variety of functions, including "one motion open function, "child-proof lock function" and others, to each of the vehicle doors even if the design specifications of the vehicle doors differ.

Preferably, the vehicle door latch operation control device is desired to have a memory in which a program for establishing the lock and unlock states is stored.

In accordance with the present invention, a vehicle door latch operation control device includes a latch release actuator operable to drive a latch mechanism which holds a door of a vehicle relative to a body of the vehicle to move the latch mechanism to a position allowing the door to be opened, a driving circuit for operating the latch release actuator, a mechanism for issuing an operation signal to turn the latch release actuator on or off, and a controller that controls operation of the driving circuit to operate the latch release actuator based on the operation signal issued from the mechanism to establish a lock state and an unlock state at an inside of the vehicle while also independently establishing the lock state and the unlock state at an outside of the vehicle

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

Figure 1:
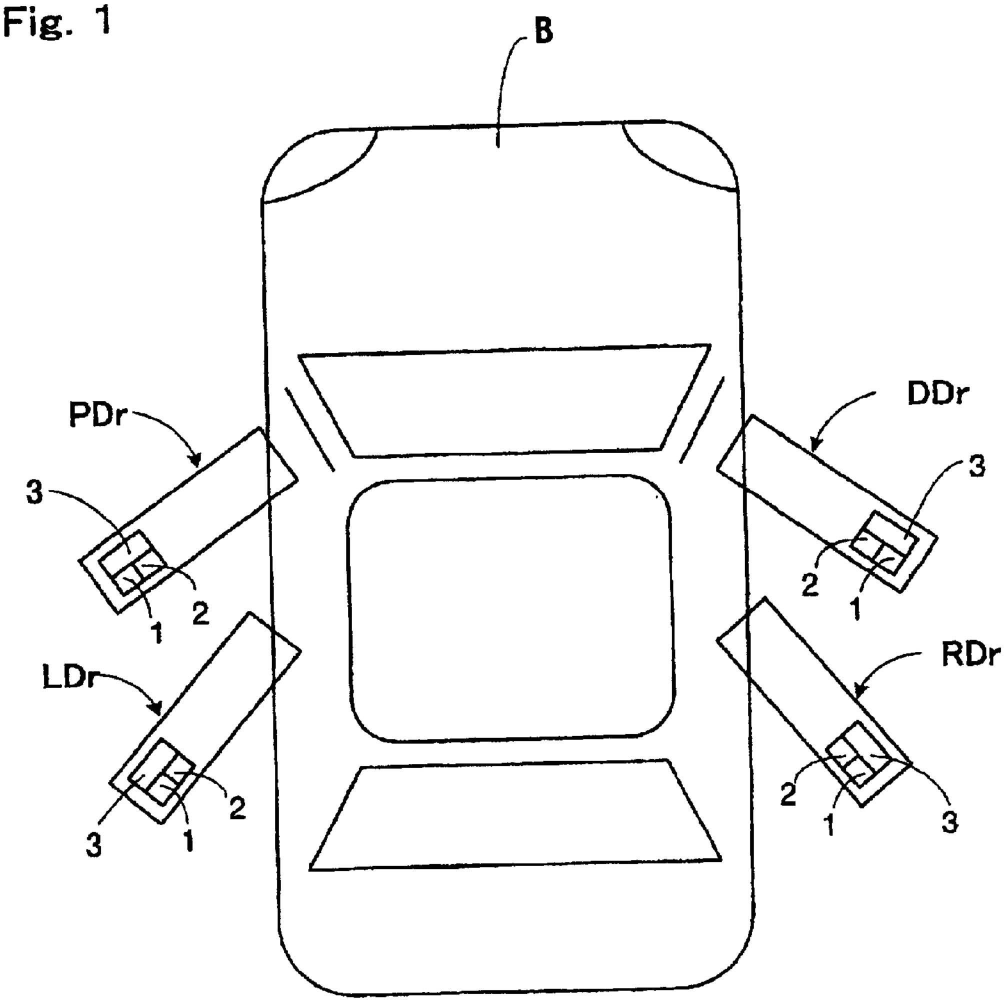
FIG. 1 is a schematic illustration of an automotive vehicle on which is provided a vehicular door latch operation control device in accordance with the present invention.

FIGS. 4—9 illustrate a flow diagram of the operation of the door controller; and FIG. 10 is a table in which is described a specification of each door of the automotive vehicle illustrated in FIG. 1.

DETAILED DESCRIPTION OF THE INVENTION

Figure 3:
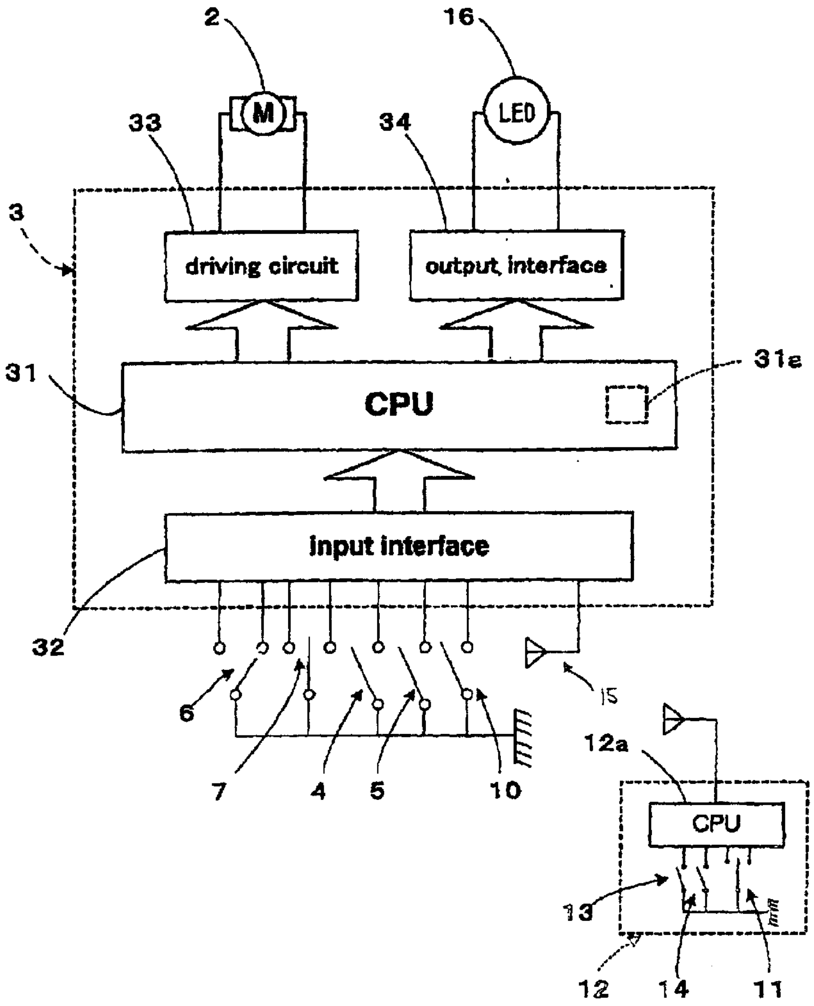
FIG. 3 is a circuit block diagram of a door controller constituting an example of the vehicular door latch operation control device.
Figure 4:
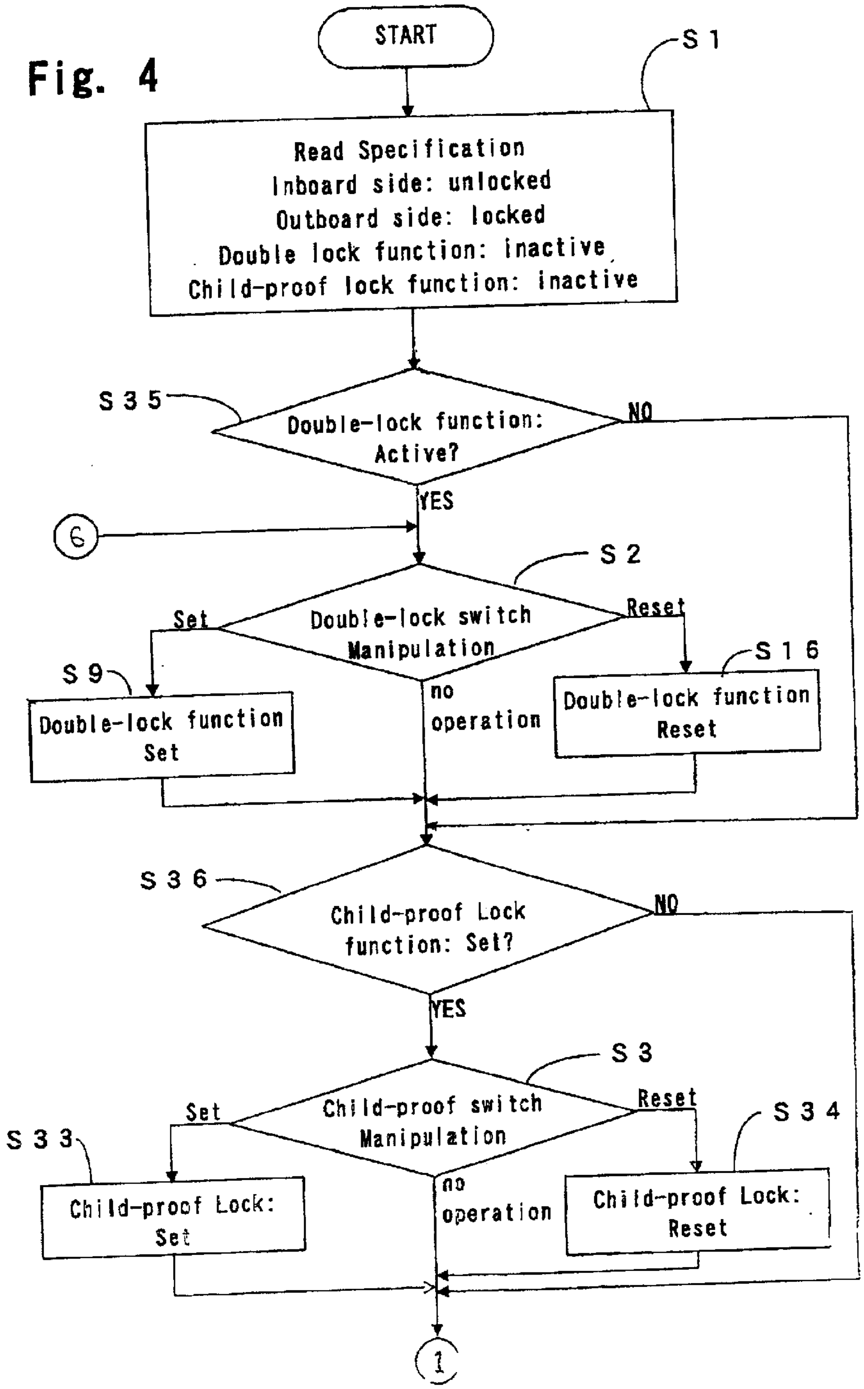
Figure 5:
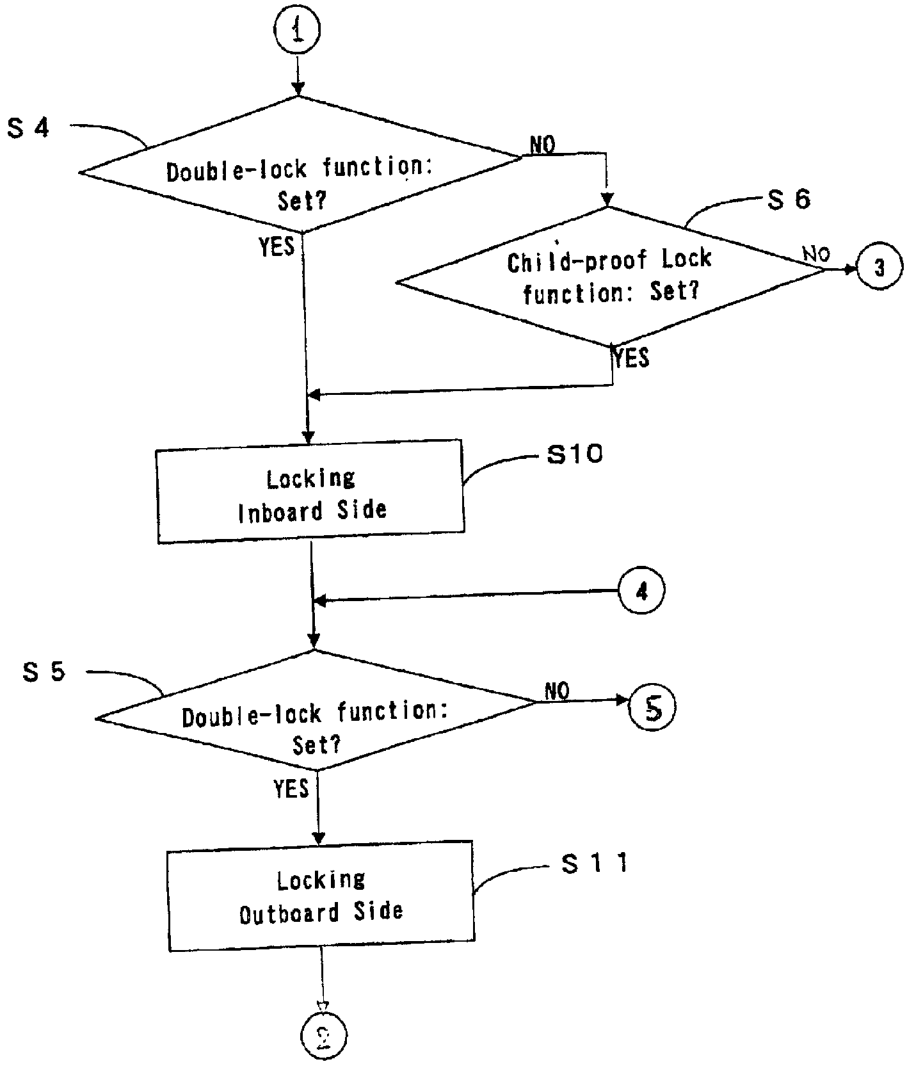
Figure 6:
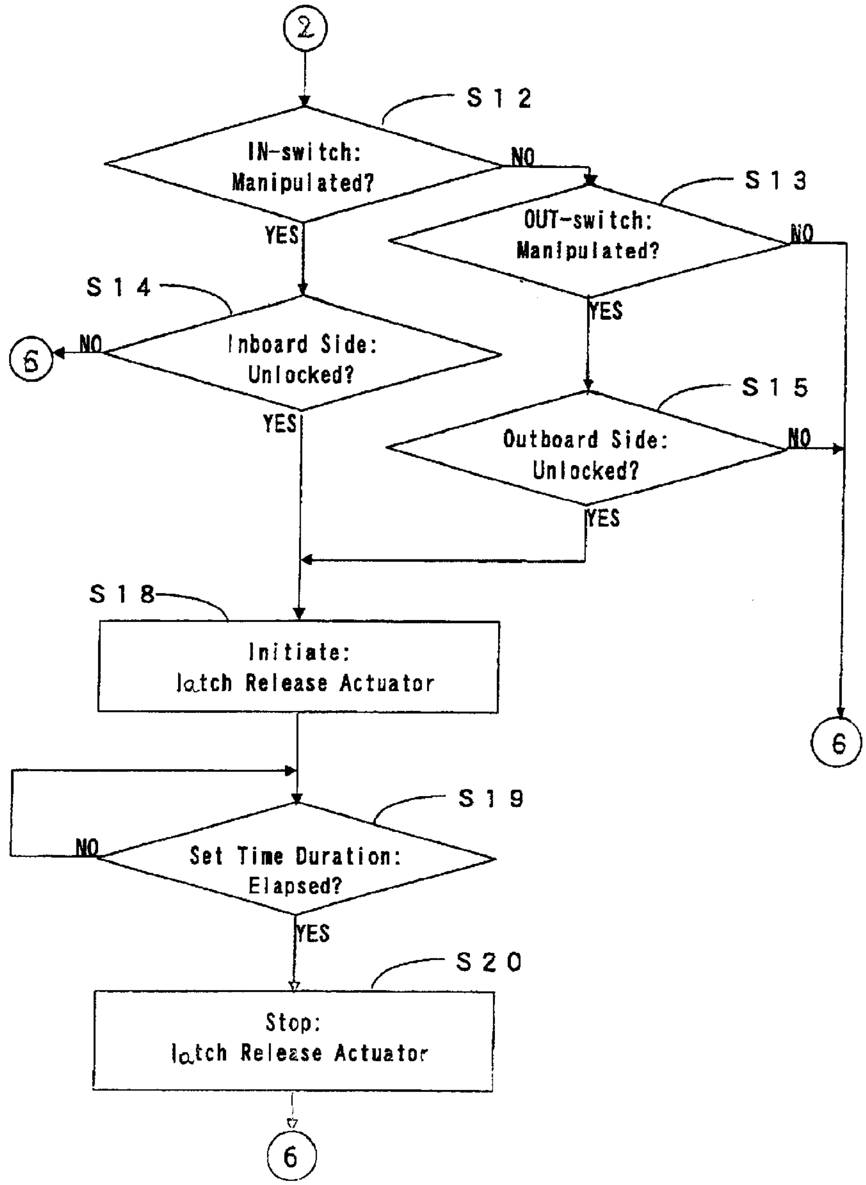
Figure 7:
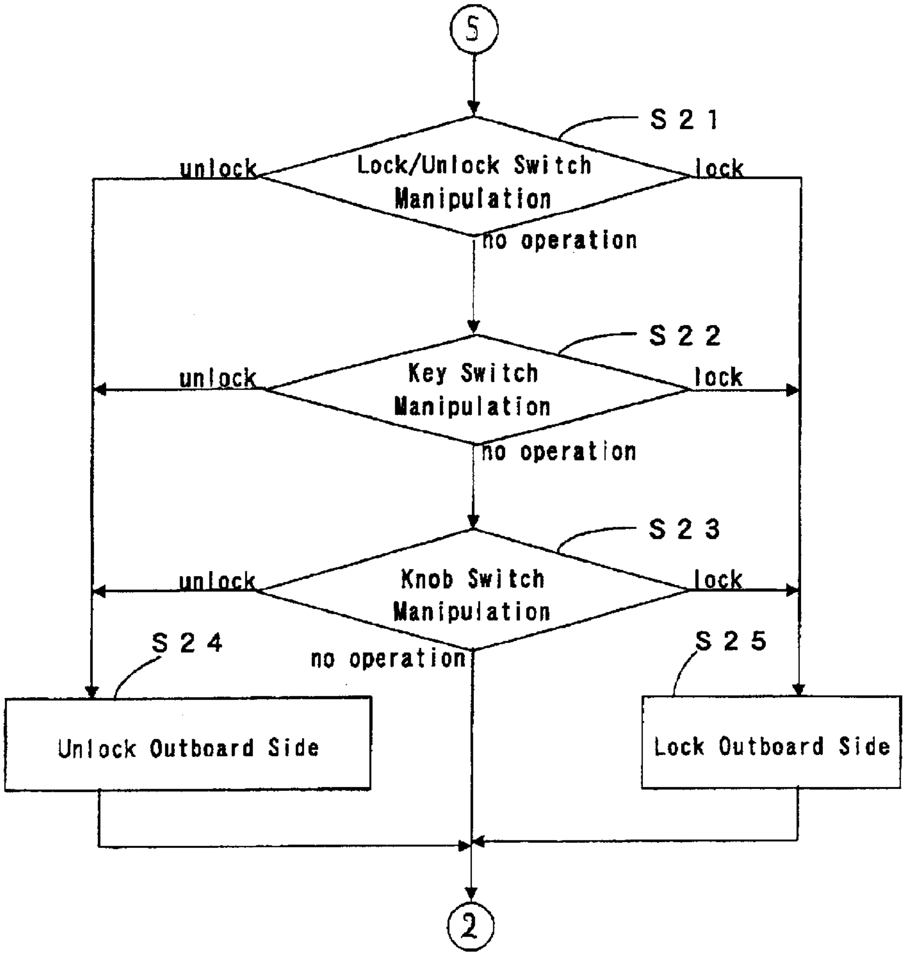
Figure 8:
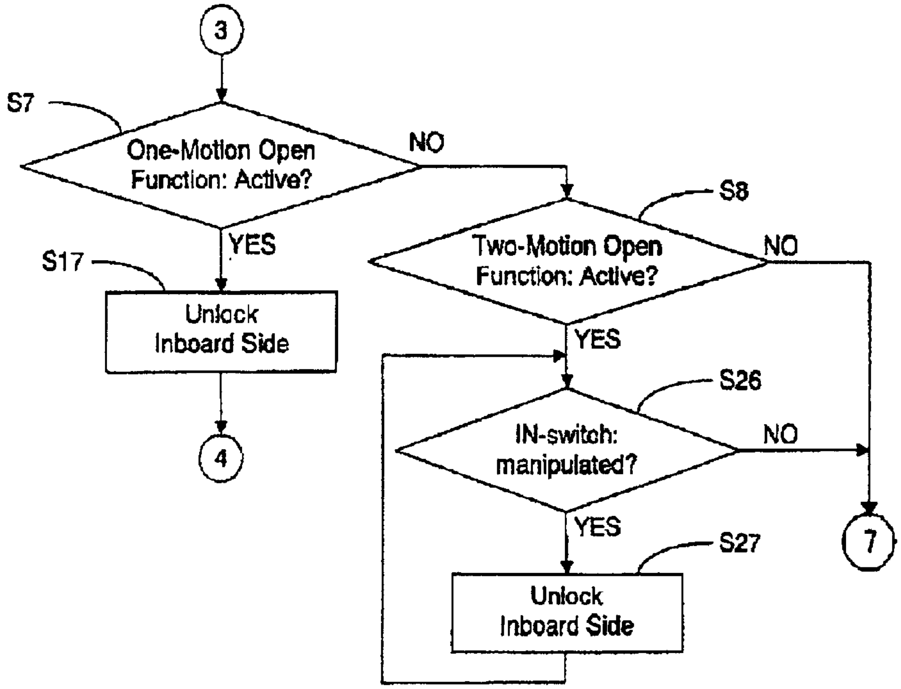
Figure 9:
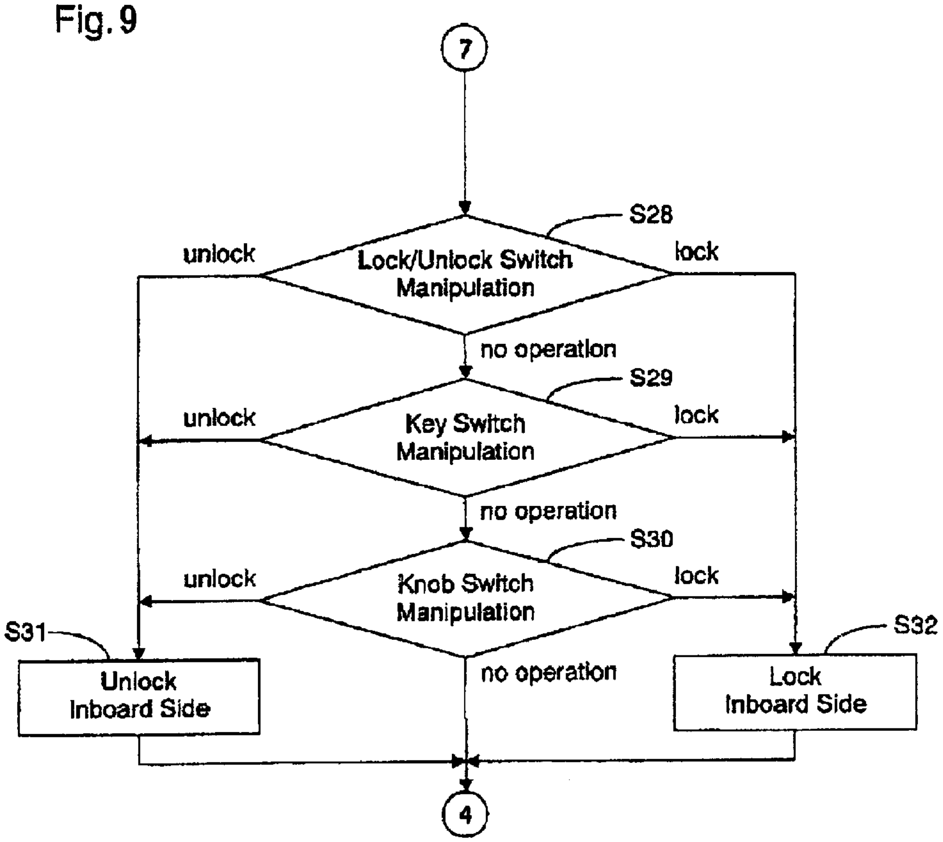

Referring initially to FIG. 1, an automotive vehicle includes a body B having various entry points or access openings that are opened or closed by each of a driver seat side door DDr, a passenger seat side door PDr, a rear-left seat side door LDr, and a rear-right seat side door RDr. Each door has a latch mechanism 1 which holds closed condition of the door and a latch release actuator 2 which allows the door to open by driving the latch mechanism 1. The latch release actuator 2 has, as its driving source, an electric motor and is controlled to operate by a door controller 3 which is driven in response to an operation of either of several handle switches 4, 5 (shown in FIG. 3) which are arranged at the inboard and outboard sides of each of the doors DDr, FDr, LDr, RDr. The inboard handle switch 4 (i.e., the IN-switch) shown in FIG. 3 is provided at the door inside handle of each of the doors DDr, FDr, LDr, RDr and is designed to issue an ON-signal when the corresponding door inside handle is manipulated. The outboard handle switch 5 (i.e. the OUT-switch) is provided at the door outside handle of each of the doors DDr, FDr, LDr, RDr and is designed to issue an ON-signal when the corresponding door outside handle is manipulated.

A door controller 3, which is mounted in each of the doors DDr, FDr, LDr, RDr, has an unlocked state and a locked state. The unlocked state and the locked state are established in response to manipulations of lock/unlock switches 6, 7 which are provided at the inboard side and the outboard side of each of the doors DDr, FDr, LDr, RDr. When the door controller 3 is in the unlocked state the latch release actuator 2 is allowed to operate, and when the door controller 3 is in the locked state the latch release actuator 2 is restricted or prohibited for operating.

The inboard side lock/unlock switch (i.e., the knob switch) 6 is placed at the locking knob of each of the doors DDr, FDr, LDr, RDr, while the outboard lock/unlock switch (i.e., the key switch) 7 is placed at the door key cylinder of each of the doors DDr, FDr, LDr, RDr. The knob switch 6, when it is transferred or positioned at a lock position and an unlock position by manipulation of the locking knob, issues a lock signal and an unlock signal, respectively. The key switch 7, when it is transferred or positioned at a lock position and an unlock position by manipulation of the door key cylinder, issues a lock signal and an unlock signal, respectively.

Figure 2:
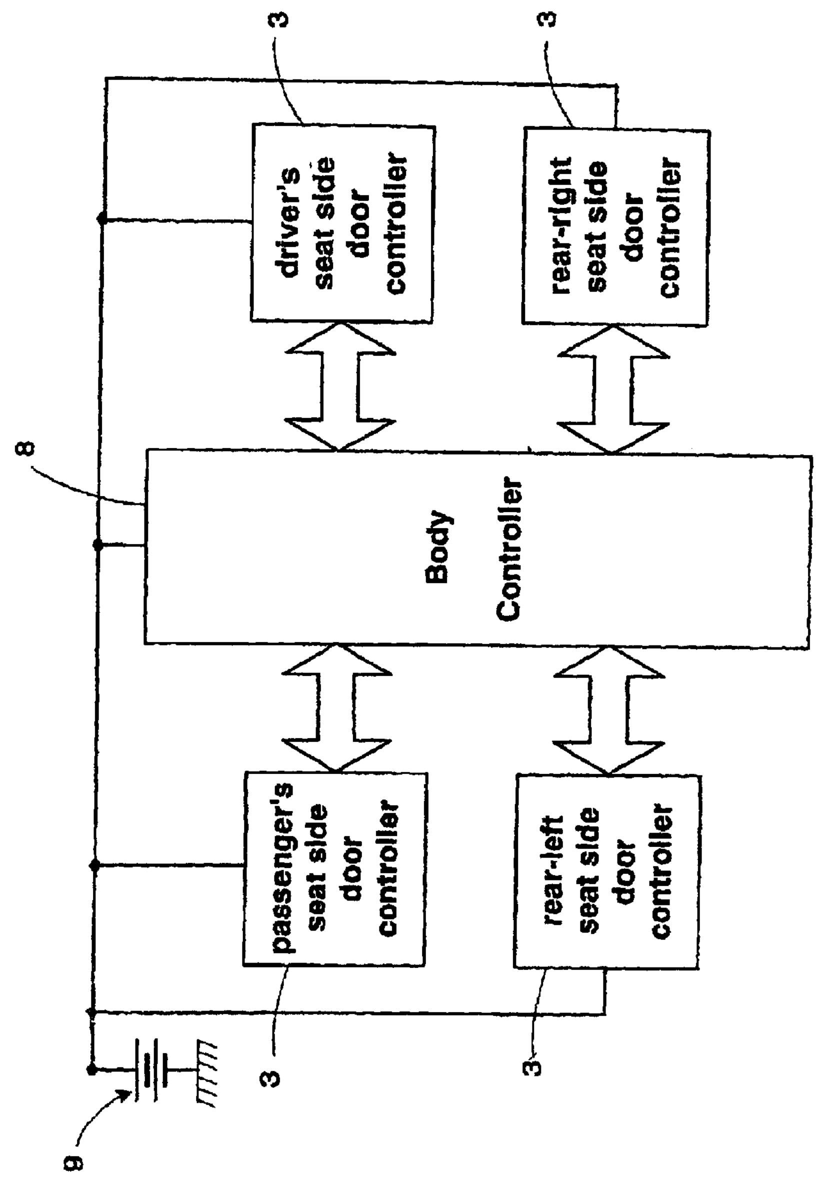
FIG. 2 is a block diagram of the vehicular door latch operation control device in accordance with the present invention.

As illustrated in FIG. 2, each of the controllers 3 is mutually connected, by way of communication, to a body controller 8 which is mounted on the vehicle body BS. Each of the controllers 3 and the body controller 8 are electrically connected to an on-vehicle battery 9 for applying or supplying current.

The body controller 8 includes a built-in storage or memory, which is readable and worktable, such as a RAM (Random Access Memory) for storing therein control programs, each of which is read into a CPU 31 of each of the door controller 3. These control programs are prepared on the basis of specifications of the doors DDr, FDr, LDr, RDr, respectively. As can be easily understood from the table represented in FIG. 9, the control program to be read into the driver seat side door controller 3 provides a "lock/unlock function" which is realized when either the driver seat side knob switch 6 or the key switch 7 is manipulated, provides a "double lock function" which is realized when a double lock switch 11 (see FIG. 3) is manipulated, and provides a "one-motion open function" which is realized when the IN-switch 4 at the driver's seat side door is manipulated.

The control program to be read into the passenger seat side door controller 3 provides a "lock/unlock function" which is realized when either the passenger seat side knob switch 6 or the key switch 7 is manipulated, provides a "double lock function" which is realized when a double lock switch 11 (see FIG.3) is manipulated, and provides a "two-motion open function" which is realized when the IN-switch 4 at the side of the passenger seat side door is manipulated.

The control program to be read into the rear-right/left seat side door controller 3 provides a "lock/unlock function" which is realized when either the rear-right/left seat aide knob switch 6 or the key switch 7 is manipulated, provides a "double lock function" which is realized when the double lock switch 11 is operated, and provides a "child proof lock function" which is realized when a child proof switch 10 is manipulated which is depicted in FIG. 3.

The "double lock function" is a setting for not bringing the door into its unlocked state even if either of the knob switch 6 and the key switch 7 is manipulated. The "one motion open function" is a setting for bringing the door into its unlocked state and for driving the latch release actuator 2 to allow the door to open by a sole or single manipulation of the IN-switch 4. The "two motion open function" is a setting for bringing the door into its unlocked state by the first manipulation of the IN-switch 4 and for driving the latch release actuator 2 to allow the door to open by the second manipulation of the IN-switch 4. The "child-proof lock" is a setting for preventing the latch release actuator 2 from being driven when the IN-switch 4 is manipulated whether the door is in its unlocked or locked state.

The double lock switch 11 is provided or placed in a handy (or hand-held) device 12 (shown in FIG. 3) which is in association with each of the door controllers 3 by way of a wireless manner such as infrared data communication or radio frequency data communication. The child-proof switch 10 is placed at a suitable position such as a door edge which is accessible only when the door is in the opened state. The double lock switch 11 issues, when transferred or positioned at a set position and a reset position, a set signal and a reset signal, respectively. The child-proof switch 10 issues, when transferred or placed at a set position and a reset position, an ON signal and an OFF signal, respectively. A lock switch 13 and an unlock switch 14, which are provided on the handy device 12, can bring the door into its locked and unlocked states, respectively, similar to the knob switch 6 and key switch 7, respectively.

It is to be noted that the foregoing different specifications of the respective doors DDr, FDr, LDr, RDr can be modified or changed rather easily by re-writing the respective control programs stored in the body controller 8. In addition, it is possible to bring the door into its unlocked state for allowing the door to open when the door controller receives an identification signal from an ECU 12*a* of the handy device 12 in such a manner that the identification signal is issued when the outboard handle switch 5 is manipulated.

The operation of the door controller 3 when used as the driver seat side door controller is as follows. As illustrated in FIG. 3, the door controller 3 includes a CPU 31 which establishes program interchange with the body controller 8. The CPU 31 has an inner memory 31*a* in which are stored the control programs specified for the driver seat side door DDr and transmitted from the body controller 8, the current locked or unlocked state at the inboard side of the driver seat side door DDr, and the current locked or unlocked state at the outboard side of the driver seat side door DDr which is independent therefrom. The inner memory 31 stores the current states indicating whether or not the "double lock function" is active and whether or not the "child-proof lock function" is active. If the "double lock function" is active, the door controller 3 continues to keep the locked states of the inboard and outboard sides of the door, respectively. If the child-proof lock function is active, the door controller 3 continues to maintain the locked state of the inboard side of the door.

The CPU 31 is connected with an antenna 15 for the communication, by way of an input interface 32, with the knob switch 6, the key switch 7, the IN-switch 4, the OUT-switch 5, the child-proof switch 10 which are at the side of the driver seat side door DDr, and the handy device 12. In addition, the CPU 31 is coupled, by way of a driving circuit 33, to the latch release actuator 2 and is also coupled, by way of an output interface 34, to an indication lamp 16. The indication lamp 16 is mounted on an inboard instrument panel or console and is adapted to indicate the current state of the inboard side of the driver seat side door DDr, namely the locked state or the unlocked state.

Next, the operation of the driver seat side controller 3 will be explained based on the flow diagram shown in FIGS. 4–8. Initially, at step S1, an initialization is performed. In this initialization, the settings are read which are specified for the driver's seat side door DDr, thereby setting the inboard side of the driver seat side door DDr as the unlocked state, the outboard side of the driver seat side door DDr as the locked state, the "double lock function" as active and the "child-proof lock function" as inactive. The resulting conditions are stored in the inner memory 31 of the CPU 31. Thus, upon power-on or resetting the door controller 3 due to runaway of the CPU 31, power supply voltage variations, etc. the inboard side of the driver's seat side door DDr is made unlocked, which makes it possible to prevent the driver and others from being kept in the vehicle body B.

Next, at steps S35 and S36, determinations are made as to whether or not the "double lock function" is active and whether or not the "child-proof lock" is active, respectively. At steps S2 and S3, determinations are made concerning manipulations of the double lock switch 11 and the child-proof switch 12. At steps S4, S5, S6, S7 and S8, determinations are made as to whether or not the "double lock function" is set, whether or not the "double lock function" is set, whether or not the "child-proof lock function" is set, whether or not the "one motion open function" is active, and whether or not the "two motion open function" is active, respectively. As can be understood from the table in FIG. 9, the specification of the driver seat side door DDr employs the "double lock function" and the "one motion open function", but does not employ the "child-proof lock function" and the "two motion open function". Thus, if the set signal is fed to the CPU 31 from the double lock switch 11 upon manipulation of the double lock switch 11, the CPU 31 stores the set state of the "double lock function" into the inner storage 31*a* at step S9, stores the locked state of the inboard side into the Inner memory 31*a* at step S10 after confirmation of the set state of the "double lock function" at step S4, and stores the locked state of the outboard side into the inner memory 31*a* at step S10 after confirmation of the set state of the "double lock function" at step S5. Under the set state of the "double lock function", even if the CPU 31 confirms manipulation of the inside door handle (the outside door handle) at step S12 (step S13) upon receipt of the ON signal from the IN-switch 4 (the OUT-switch 5) which results from manipulating the inside door handle (the outside door handle), the locked state of the inboard side and the locked state of the outboard side are confirmed at step S14 and step S15, respectively, which fails to drive the latch release actuator 2, thereby not allowing the driver seat side door DDr to open.

It is to be noted that under the active state of the "double lock function", even if the CPU 31 is fed with any one of the unlock signal, the unlock signal, and the On signal from the knob switch 6, the key switch 7, and the unlock switch 14, respectively, when the knob switch 6 is placed at its unlock position, the key switch 7 is placed at its unlock position, and the unlock switch 14 is manipulated, respectively, the CPU 31 maintains the locked states of the respective inboard side and the outboard side irrespective of such a signal.

If step S2 reveals that the double lock switch 11 is manipulated to its reset position and the resultant signal is fed therefrom to the CPU 31, at step S16, the CPU 31 stores in the inner memory 31*a* that the "double lock function" has been reset and confirms at step S6 whether or not the "child-proof lock function" is set after confirmation of the set state of the "double lock function" at step S4. At this time, as previously mentioned, the specification for the driver's seat side door DDr does not employ the "child-proof lock" and therefore the CPU 31 confirms the reset state of the "child-proof lock" irrespective of manipulation of the child-proof switch 12. Then, after confirmation of the reset state of the "child-proof lock" at step S6, the CPU 31 confirms the settings of the "one motion open function" and the "two motion open function" at step S7 and step S8, respectively. At this time, as previously mentioned, the specification for the driver seat side door DDr employs the "one motion open function" and therefore the CPU 31 stores the unlock state of the inboard side in the inner memory 31*a*.

Under the condition that the "double lock function" is confirmed to be reset at steps S4 and S5, if the CPU 31 confirms that the inside door handle has been manipulated on the basis of the ON signal which is fed or inputted to the CPU 31 and which is issued from the IN-switch 4 upon manipulation of the IN-switch 4 as a result of manipulating the inside door handle, due to the fact that setting the "one motion open function" makes the inboard side unlocked, the CPU 31, after confirmation of the unlocked state of the inboard side unlocked at step S14, issues at step S18 the driving signal to the driving circuit 33 to drive the latch release actuator 2 such that the latch release actuator 2 continues to operate until a predetermined time duration T has elapsed. If the CPU 31 confirms at step S20 that the predetermined time duration T has elapsed, the CPU 31 issues a stop signal to the driving circuit 33 to stop the latch release actuator 2. Thus, manipulating the inside door handle causes operation or driving of the latch release actuator 2, which results in the latch mechanism 1 being allowed to open the driver seat side door DDr.

Under the condition that the "double lock function" is confirmed to be reset at steps S4 and S5, if any one of the unlock switch 11, the key switch 7, and the knob switch 6 is manipulated, the corresponding one of the ON signal, the unlock signal, and the unlock signal is fed or inputted to the CPU 31. The CPU 31 confirms the manipulation of the unlock switch 11, the key switch 7, and the knob switch 6 at step S21, step S22, and step S23 respectively, and stores the unlocked state of the outboard side in the inner memory 31*a* at step S24. Under the condition that the "double lock function" is reset and the outboard side is unlocked, if the OUT-switch 5 is manipulated which results from manipulating the outside door handle, the ON signal which is issued therefrom is inputted or fed to the CPU 31. Then, at step S13, the CPU 31 confirms, based on this ON signal, that the out side door handle has been manipulated. Due to the fact that at this time the outboard side is unlocked, at step S15 the CPU 31 confirms the unlocked state of the inboard side.

Thereafter, at step S18 the CPU 31 issues a driving signal to the driving circuit 33 for driving the latch release actuator 2 such that the latch release actuator 2 continues to be driven until lapse of the time duration T. Upon elapse of the time duration T determined at step S19, the CPU 31 issues a stop signal to the driving circuit 33 at step S20 to turn off the latch release actuator 2. Thus, manipulating the outside door handle causes the latch release actuator 2 to operate or drive, which results in the latch mechanism 1 being allowed to open the driver seat side door DDr.

When it is confirmed that the "double lock function" is reset at step S4 and step S5, if any one of the lock switch 13, the key switch 7, and the knob switch 6 is manipulated, the resulting signal (i.e., the ON signal form the lock switch 13, the lock signal from the key switch 7, or the lock signal from the knob switch 6) is fed or inputted to the CPU 31. The CPU 31 confirms the manipulation of the unlock switch 11, the key switch 7, and the knob switch 6 at steps S21, S22, and S23, respectively, and stores the locked state of the outboard side in the inner memory 31*a* at step S25. Under the condition that the "double lock function" is reset and the outboard side is locked, if the OUT-switch 5 is manipulated resulting from manipulation of the outside door handle, the ON signal which is issued from the OUT-switch is inputted or fed to the CPU 31. Then, at step S13, even if the CPU 31 confirms on the basis of this ON signal that the outside door handle has been manipulated, due to the fact that at this time the outboard side is locked, at step S15 the CPU 31 confirms the locked state of the outboard side. Thus, the latch release actuator 2 is not driven and so the driver seat side door DDr is not allowed to open.

It is to be noted that even if the CPU 31 is fed with the ON signal and the OFF signal when the "child-proof function" is set and reset, respectively, due to the fact the specification of the driver's seat side door DDr does not employ the "child-proof function", at step S36 the "child-proof function" is deemed not be set and therefore step S3 is not executed. As a result, the CPU 31 does not acknowledge or cancels the inputted ON and OFF signals.

When the "child-proof lock function" is provided in the rear-left seat side door and/or the rear-right seat side door, if the child-proof switch 12 is placed to the set position, the resulting or set signal is fed to the CPU 31. Then, at step 33, the CPU 31 stores the resulting or newly set state of the "child-proof lock function" in the inner memory 31*a*. The CPU 31 confirms the set state of the "double lock function" and the set state of the "child-proof lock function" at steps S4 and S6, respectively. Thereafter, at step S10, the CPU 31 stores the locked state of the inboard side in the inner memory 31*a*. Under the condition that the "child-proof lock function" is set, if the inside door handle is manipulated, the IN-switch 4 is turned on, and so the ON signal is fed from the switch 4 to the CPU 31. Even if the CPU 31 confirms at step S12 that the inside door handle has been manipulated, due to the locked state of the inboard side, at step S14 the CPU 31 confirms such a condition, thereby not driving the latch release actuator 2. Thus, the rear-left seat side door and/or the rear-right seat side door is not permitted to be opened. If the child-proof switch 12 is positioned to the rest position, the resulting or rest signal is fed to the CPU 31*a* and at step 34 the rest state of the "child-proof lock function" is stored in the inner memory 31*a*.

When the "two motion open function" is provided in the passenger seat side door FDr, for example, the CPU 31 confirms at step S8 that the "two motion open function" has been set. If the inside door handle is manipulated, the IN-switch 4 is turned on, which results in the resulting or ON signal being fed therefrom to the CPU 31. If the CPU 31 confirms at step S26 on the basis of this signal that the inside door handle has been manipulated, at step S27 the CPU 31 stores the unlocked state of the inboard side in the inner memory 31*a*. Subsequently, if the CPU 31 is fed with an ON-signal from the IN-switch 4 due to the second time closure of the IN-switch 4 at the second time the inside door handle is manipulated, the CPU 31 confirms on the basis of this signal at step S12 that the inside door handle has been manipulated, which results in a determination of the unlocked state of the inboard side at step S14. Thus, thereafter, the CPU 31 issues at step S18 the driving signal to the driving circuit 33 for driving the latch release actuator 2 in such a manner that the latch release actuator 2 is brought into a continued driven state until an elapse of time duration T is confirmed at step S19. After the elapse of the time duration T, at step S20 the CPU 31 issues the stop signal to the driving circuit 33 to stop or turn off the latch release actuator 2. Thus, manipulating the inside door handle causes the latch release actuator 2 to turn on, which makes it possible to drive the latch mechanism 1.

In addition, if the manipulation of the inside door handle is not confirmed at step S26 and if the CPU 31 is inputted with the ON-signal from the unlocking switch 11, the unlocking signal from the key switch 7, or the unlocking signal from the knob switch 6 as a result of the corresponding one of the unlocking switch 11, the key switch 7 and the knob switch 6, the manipulation of the corresponding one of the unlocking switch 11, the key switch 7 and the knob switch 6 is made at steps S28, S29, and S30, respectively. Then, at step S31, the CPU 31 stores the unlocked state of the inboard side in the inner memory 31*a*. Moreover, if the manipulation of the inside door handle is not confirmed at step S26 and if the CPU 31 is inputted with the ON-signal from the locking switch 12, the unlocking signal from the key switch 7, or the unlocking signal from the knob switch 6 as a result of the corresponding one of the locking switch 12, the key switch 7 and the knob switch 6, the manipulation of the corresponding one of the locking switch 12, the key switch 7 and the knob switch 6 is made at steps S28, S29, and S30, respectively. Then, at step S31, the CPU 31 stores the locked state of the inboard side in the inner memory 31*a*.

Although in the foregoing explanation, the circuit diagram and its operation and function of the door controller 3 are explained in the context of the controller 3 acting for the driver seat side door, the door controller 3 is available for other different doors. Of course, the circuit diagram of the door controller 3 can be altered or modified pursuant to the specification of each of the doors DDr, FDr, LDr, RDr, and the door controllers 3 for the respective doors FDr, LDr, RDr can be rendered to a central control at the driver seat side door controller 3. In addition, it is possible to use other vehicular information (i.e., signals representative of vehicular travel speed, door open/close signals, ignition on/off signals, seat-belt fitting/release signals, and the like) such as inputted to the door controller 3 for establishing a variety of modes alternating between the unlock state and the lock state in each of the inboard side and the outboard side of each of the doors DDr, FDr, LDr, RDr.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle door latch operation control device comprising:

a latch release actuator driving a latch mechanism which holds the door relative to a vehicle body so as to allow the door to be opened;

trigger means for alternatively turning on and off the latch release actuator; and a controller controlling operation of the latch release actuator based on an operation signal issued from the trigger means, the controller being provided with a lock/unlock setting portion which establishes a lock state and an unlock state at each of an inside and an outside of the vehicle body independently.

2. The vehicular door latch operation control device as set forth in claim 1, further comprising a memory in which a program for establishing the lock and unlock states is stored.

3. A vehicle door latch operation control device comprising:

a latch release actuator operable to drive a latch mechanism which holds a door of a vehicle relative to a body of the vehicle to move the latch mechanism to a position allowing the door to be opened;

means issuing an operation signal to turn the latch release actuator on or off;

a driving circuit for operating the latch release actuator; and a controller controlling the driving circuit to operate the latch release actuator based on the operation signal issued from said means to establish a lock state and an unlock state at an inside of the vehicle while also independently establishing the lock state and the unlock state at an outside of the vehicle.

4. The vehicular door latch operation control device as set forth in claim 3, further comprising a memory in which is stored a control program for establishing the lock and unlock states.

5. The vehicular door latch operation control device as set forth in claim 3, further comprising a memory in which is stored a current locked or unlocked state at the inside of the vehicle and a current locked or unlocked state at the outside of the vehicle.

6. The vehicular door latch operation control device as set forth in claim 3, further comprising a memory in which is stored a current state of whether or not a double lock function is active.

7. The vehicular door latch operation control device as set forth in claim 3, further comprising a memory in which is stored a current state of whether or not a child-proof lock function is active.

* * * * *